US006721869B1

United States Patent
Senthil

(10) Patent No.: US 6,721,869 B1
(45) Date of Patent: Apr. 13, 2004

(54) METHOD FOR DERIVING A WORD ADDRESS AND BYTE OFFSET INFORMATION

(75) Inventor: Gurumani Senthil, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 623 days.

(21) Appl. No.: 09/639,181

(22) Filed: Aug. 15, 2000

(51) Int. Cl.[7] .............................................. G06F 12/10
(52) U.S. Cl. ....................................... 711/202; 711/173
(58) Field of Search ................................. 711/200, 202, 711/219, 220, 5

(56) References Cited

U.S. PATENT DOCUMENTS

| | | | | |
|---|---|---|---|---|
| 4,376,972 A | * | 3/1983 | Johnson et al. | 711/201 |
| 4,652,993 A | * | 3/1987 | Scheuneman et al. | 711/151 |
| 4,876,663 A | * | 10/1989 | McCord | 345/545 |
| 4,903,197 A | * | 2/1990 | Wallace et al. | 711/5 |
| 4,920,483 A | * | 4/1990 | Pogue et al. | 711/219 |
| 5,159,665 A | * | 10/1992 | Priem et al. | 345/627 |
| 6,128,638 A | * | 10/2000 | Thomas | 708/606 |

FOREIGN PATENT DOCUMENTS

WO     WO 0041137     *     7/2000

* cited by examiner

Primary Examiner—Kevin L. Ellis
Assistant Examiner—Thang H Ho

(74) Attorney, Agent, or Firm—Akin Gump Strauss Hauer & Feld LLP

(57) ABSTRACT

A method for addressing a particular location of a memory organized as a plurality of words having an odd number (e.g., three) partitions. Upon receiving an address for a particular memory location, address translation circuitry according to the present invention effectively converts the address to a floating point number. The address translation circuitry then divides the received address by three to determine which word of memory—and which byte—is being addressed. In particular, the quotient of the division process provides the word address, while the remainder provides the byte offset. Memory addressed by the present invention may be organized into "words" of varying length. For example, each "word" may be ninety-six bits wide, with partitions of thirty-two bits each. In this embodiment, the remainder of the division process identifies a particular thirty-two bit partition. The address translation circuitry performs the division by three operation by multiplying the floating point number by a binary value of approximately one third (0.010101 ... ). In one embodiment, the two most significant bits of the fractional portion of the result equal the required byte offset (e.g., 0=00 binary; 1=01 binary and 2=10 binary). The binary multiplication process involves shifting and adding of the floating point number. Shifting of the floating point number is equivalent to selecting different portions of the received address for addition. Combinational logic (i.e., logic that is not clocked) may be used to perform the translation process. In this manner, address translation may be completed in as few as a single clock cycle.

20 Claims, 2 Drawing Sheets

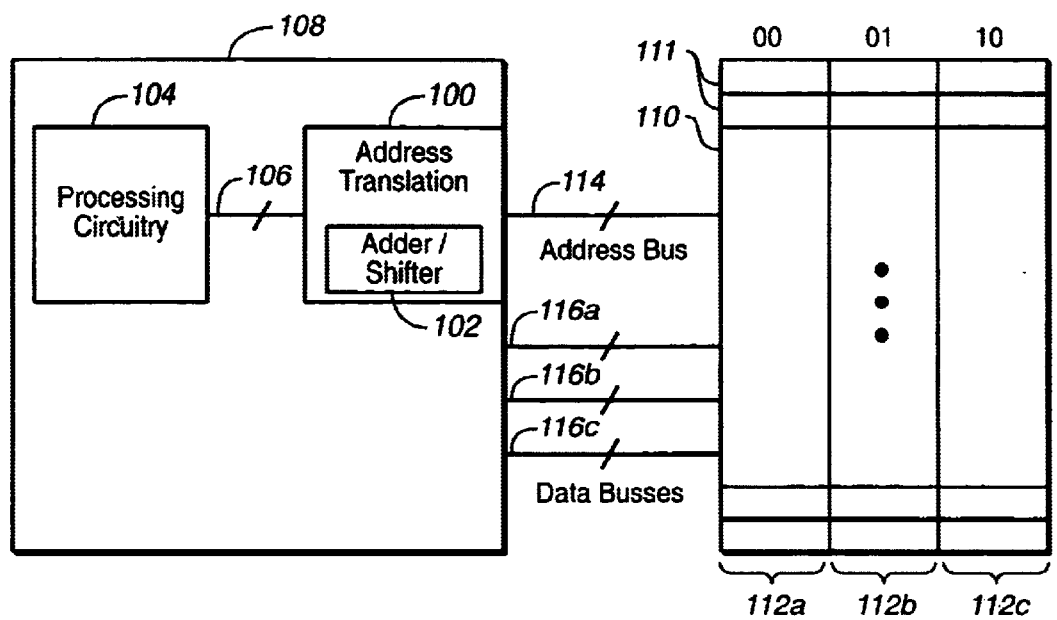
FIG._1
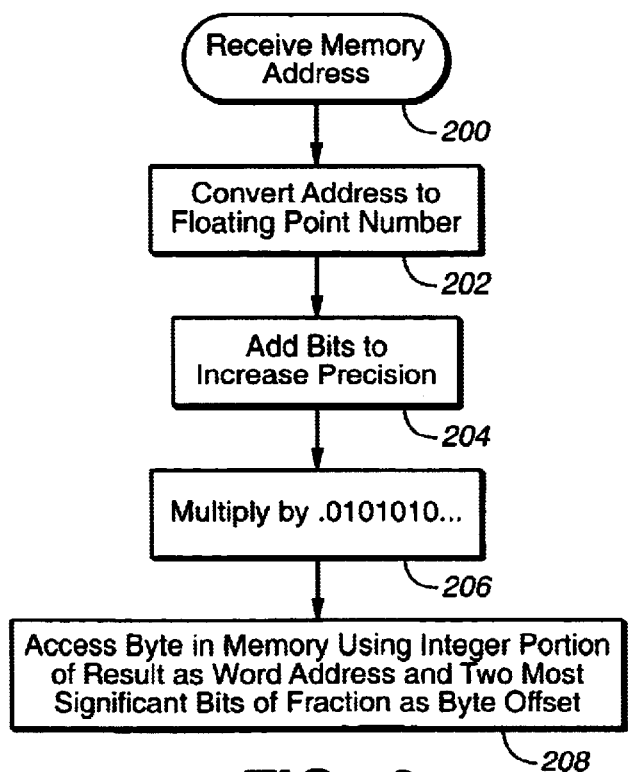
FIG._2

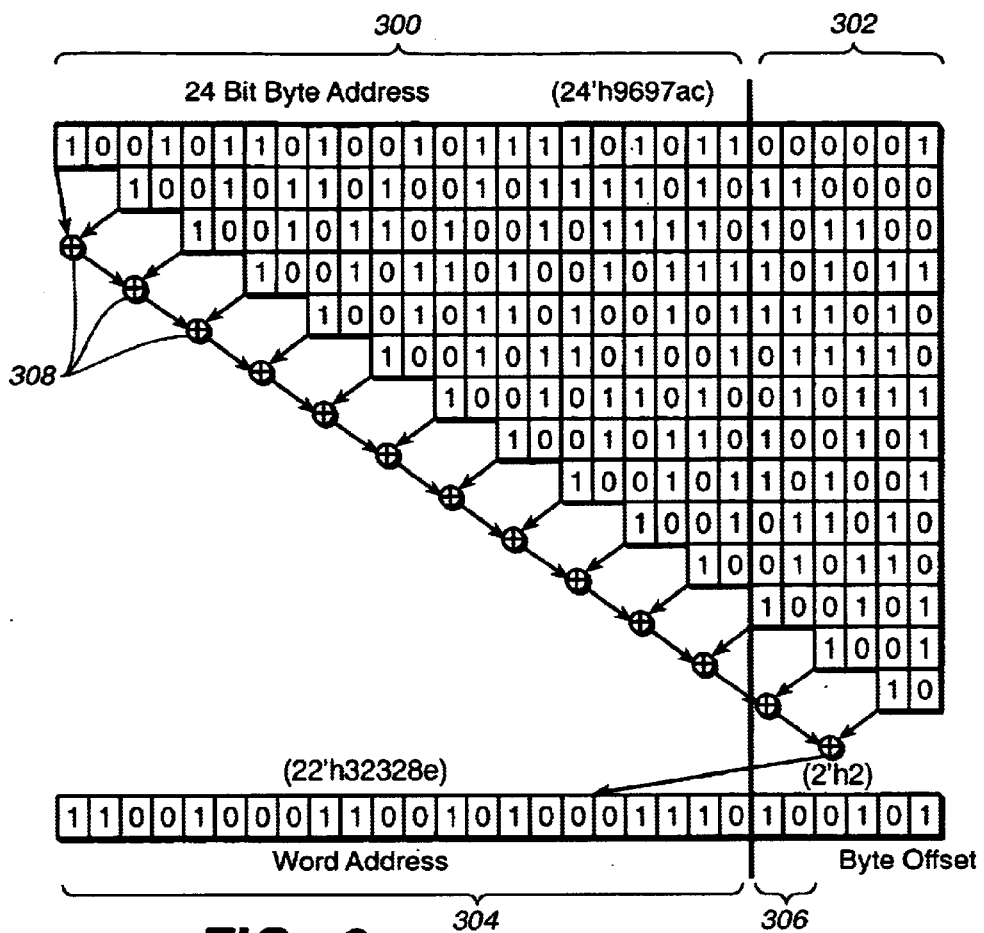
FIG._3
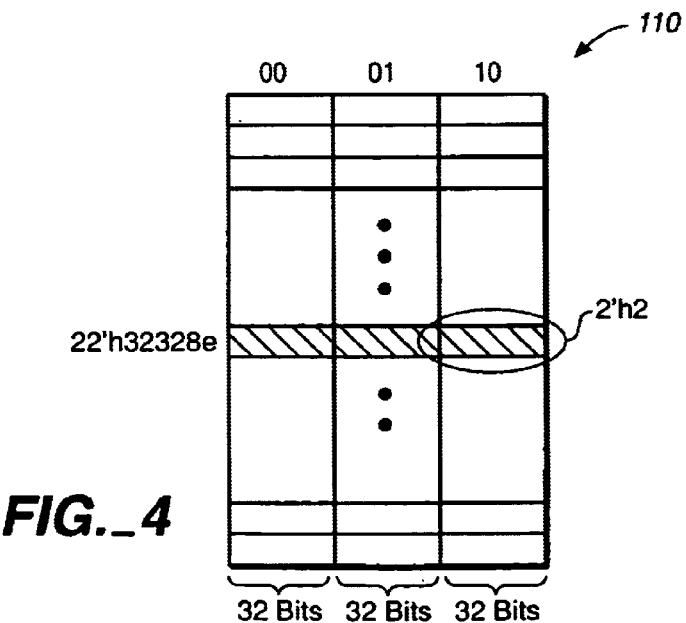
FIG._4

METHOD FOR DERIVING A WORD ADDRESS AND BYTE OFFSET INFORMATION

FIELD OF THE INVENTION

The present invention relates generally to data processing circuitry; and, more particularly, it relates to a method of addressing a particular location of a memory organized into words having three partitions.

BACKGROUND OF THE INVENTION

In most types of data processing systems, memory is provided to store data and instructions for use by processing circuitry. When processing circuitry (e.g., a processor core) needs to write data into or read data out of an external memory location, an address is generated for the data and placed on an address bus. The address is typically generated by an addressing unit of the data processing circuitry, and frequently specifies a particular group of bits within a memory partition.

Address translation circuitry may be utilized to convert an address provided to or received from an addressing unit to an address used by a direct memory access (DMA) controller/memory controller to access the physical memory space. Corresponding data is then driven on a data bus or system bus during a data cycle. Operation of the address translation circuitry is typically transparent to the processing circuitry.

Memory may be organized in many ways, including physical or logical partitions of varying widths and depths. Consequently, many different addressing schemes are employed. In one common memory architecture, the addressing mechanism generates a binary address for a specific byte. This address may then be translated or mapped to the physical location of the byte in memory. If the memory is organized into partitions of two- or four-byte words, address mapping is relatively straightforward. More particularly, in the case of a memory having a four byte depth, the last two bits of the address identify a particular one of four bytes at a given double-word address. Similarly, in a memory having a two byte depth, only one bit is needed to identify a particular byte.

For various reasons, it may be desirable to organize memory into "words" having an odd number of partitions. For example, a memory can be organized into words having three partitions in order to provide improved bandwidth over a smaller number of partitions, or to eliminate packaging or board costs associated with a greater number of partitions. The classic approach to address translation, if applied to address generation in such a system, is not effective. For at least this reason, odd numbers of memory partitions have largely been avoided in prior systems.

SUMMARY OF THE INVENTION

Briefly, the present invention relates to a method for addressing a particular location of a memory organized as a plurality of words having an odd number (e.g., three) of partitions. The method permits, for example, efficient translation of a byte address into a word address and byte offset value. The method provides greater flexibility in the organization of memory, thereby permitting designers to optimize memory system designs according to bandwidth requirements and other constraints.

Upon receiving an address for a particular memory location, address translation circuitry according to the present invention effectively converts the address to a floating point number. The address translation circuitry then divides the received address by three to determine which word of memory—and which byte—is being addressed. In particular, the quotient of the division process provides the word address, while the remainder provides the byte offset. Memory addressed by the present invention may be organized into "words" of varying length. For example, each "word" may be ninety-six bits wide, with partitions of thirty-two bits each. In this embodiment, the remainder of the division process identifies a particular thirty-two bit partition.

The address translation circuitry performs the division by three operation by multiplying the floating point number by a binary value of approximately one third (0.010101 . . . ). The binary multiplication process involves shifting and adding of the floating point number. Shifting of the floating point number is equivalent to selecting different portions of the received address for addition.

In one embodiment of the invention, bits are added to the received address to increase the precision of the division operation such that the fractional result will settle to one of 0.000 . . . , 0.0101 . . . or 0.1010 . . . binary. In this embodiment, the two most significant bits of the fractional portion of the result equal the required byte offset (e.g., 0=00 binary; 1=01 binary and 2=10 binary). The integer portion of the result is the translated word address.

The byte address may be stored in registers and shifted left by two bits at a time to perform the division operation. However, shifting/division using registers or other sequential logic requires at least one clock cycle per two bits of address. Depending on the size of the address bus, the translation process may thus consume several clock cycles. Accordingly, in one embodiment of the invention the division process is carried out by combinational logic (i.e., logic that is not clocked). In this manner, address translation may be completed in as few as a single clock cycle.

BRIEF DESCRIPTION OF THE DRAWINGS

A better understanding of the present invention can be obtained when the following detailed description of an exemplary embodiment is considered in conjunction with the following drawings, in which:

FIG. 1 is a schematic diagram of an exemplary system for performing address translation operations in accordance with the present invention;

FIG. 2 is flow diagram of an exemplary address translation operation according to the present invention;

FIG. 3 is a logical representation of an exemplary address translation according to the method of FIG. 2; and FIG. 4 is a schematic diagram of a memory access according to the address translation procedure of FIG. 3.

DETAILED DESCRIPTION OF THE INVENTION

FIG. 1 is a schematic diagram of an exemplary system for performing address translation operations in accordance with the present invention. The system enables addressing a particular location of a memory organized as a plurality of words having an odd number of partitions. For example, a byte address may be efficiently translated into a word address and byte offset value corresponding to a particular location. By permitting efficient addressing of an odd number of partitions, a method according to the invention provides greater flexibility in the organization of memory.

In the embodiment of FIG. 1, address translation circuitry 100 is provided to perform the desired address translation functions for accessing a memory 110. As described in greater detail below, upon receiving an address for a particular location in the memory 110, the address translation circuitry 100 effectively converts the address to a floating point number. Using adder/shifter logic 102, the address translation circuitry 100 then divides the received address by three to provide a translated address for accessing the memory 110. In particular, the quotient of the division process provides a word address, while the remainder provides an offset value. In general, eight bits of data are referred to as a "byte"; two bytes are called a "word"; and four bytes are called a "double word". As used in this specification, the term "word" is used generically to refer to a portion of memory organized into an odd number of partitions (e.g., three bytes).

Information stored in the memory 110 is utilized by processing circuitry 104. It is contemplated that the processing circuitry 104 may comprise a processor core, a digital signal processor (DSP) core, or other similar type of circuitry. The processing circuitry 104 communicates with the addressing translation circuitry 100 via a bus 106. In one embodiment of the invention, the address translation circuitry 100 and processing circuitry 104 are formed on a common substrate as part of a device 108. In this embodiment, the bus 106 is an internal address bus for communicating addresses produced by the processing circuitry 104 to the address translation circuitry 100. The precise nature of the device 108 is not considered critical to the invention. The device 108 may be configured, for example, as an Ethernet switch or other type of communication circuit.

In the disclosed embodiment, the memory 110 is organized into a plurality of words 111. Each of the words 111 comprises three partitions 112a, 112b and 112c. Each partition 112a–112c is separately addressable by an address placed on an address bus 114 by the address translation circuitry 100. The address bus 114 may be coupled directly to the memory 110, or via a memory controller, DMA controller, or similar type of circuitry depending on the system configuration. In this embodiment of the invention, a separate data bus 116a, 116b, or 116c is provided for communicating data stored in each of the partitions 112a–112c. Use of three data busses 116a–c may provide improved system efficiency in data intensive applications.

As will be appreciated, other configurations are possible without departing from the spirit and scope of the invention. In one contemplated embodiment, the memory 110 is organized into words 111 having a width of 96 bits (see FIG. 4). In this embodiment, each of the partitions 112a–112c are 32 bits (4 bytes) wide. Alternatively, each word 111 could be comprised of three byte-wide partitions 112a–112c. Of course, many other configurations are possible.

Although addresses received from processing circuitry 104 may be stored in registers and shifted left by two bits at a time to perform the division operation, using registers or sequential logic requires at least one clock cycle per two bits of address. Depending on the size of the address bus 114, the translation process may thus consume several clock cycles. Accordingly, in one embodiment of the invention, the adder/shifter circuitry 102 is comprised of combination logic (i.e., logic that is not clocked) for carrying out the division process. In this manner, address translation may be completed in as few as a single clock cycle of a clock signal utilized by the processing circuitry 104.

FIG. 2 is a flow diagram of an exemplary address translation operation according to the present invention. Upon receiving a memory address in step 200, address translation circuitry 100 or other system resources convert the address to a binary floating point number in step 202. As will be appreciated, any number containing a decimal point is generally referred to as a floating point number. Next, in step 204, bits are added to the fractional portion of the binary floating point number in order to increase precision such that the fractional result of subsequent operations will settle to a permitted value.

Next, in step 206, the binary floating point number is multiplied by a binary value of approximately one-third. The result of this multiplication step includes an integer portion and a fraction portion. In step 208, a particular location (e.g., a byte) in the memory 110 is accessed using the integer portion of the result of the multiplication step as a word address, and the two most significant bits of the fractional portion of the result of the multiplication step as a byte offset value.

FIG. 3 is a logical representation of an exemplary address translation according to the method of FIG. 2. In this example, a 24-bit byte address 300 is converted to a word address 304 and byte offset value 306. The byte address 300 is treated as a binary floating point number having added precision bits 302. The precision bits 302 are added to the received address to increase the precision of the division operation such that the fractional result will settle to one of 0.000 . . . , 0.0101 . . . , or 0.1010 . . . In this embodiment, the two most significant bits of the fractional portion of the result equal the required byte offset 306 (e.g., 0=00 binary; 1=01 binary; and 2=10 binary). The integer portion of the result is the translated word address 304.

As previously mentioned, the address translation circuitry 100 performs the division by three operation by multiplying the floating point number by binary value of approximately one-third (0.010101 . . . ). As known to those skilled in the art, binary multiplication involves shifting and adding of a binary number. In the disclosed embodiment, shifting of the floating point number is equivalent to selecting different portions of the received address.

In the address translation of FIG. 3, the byte address 300 and precision bits 302 are successively shifted to the right by two bits, with each shifting process forming a new stage that is added to the previous stages by a plurality of addition or summation stages 308. Shifting by two bits provides the proper result because the zeros in the binary value of one-third (0.010101 . . . ) do not affect the result of the multiplication process, and can thus be ignored. In the disclosed embodiment, the summation circuits 308 function equivalently to a thirteen-stage adder. As illustrated, a 24-bit address 300, expressed in a hexagonal format as 24'h9697ac is converted to a 22-bit word address 304 value of 22'h32328e, with a byte offset 306 value of 2'h2. For clarity of illustration, the carry bits of the addition process have been omitted. It should be noted that with appropriate modifications to the translation circuitry 100, a method according to the present invention may be utilized with other numbers of odd memory partitions, such as five or seven.

FIG. 4 is a schematic diagram of the portion of the exemplary memory 110 accessed according to the address translation procedure of FIG. 3. In particular, the word located at the translated address 22'h32328e is identified by address decoding circuitry (not separately illustrated) as containing the relevant data. Further, the partition (in this case, a 32-bit wide partition) labeled "10" is selected by the byte offset value 2'h2. The data stored at this memory location may be selectively driven to one of the data buses 116a–116c. Alternatively, the device 108 may utilize the translated address information to selectively retrieve data from the data buses 116a–c.

Thus, a method for addressing a particular location of a memory organized as a plurality of words having an odd number of partitions has been described. The method permits efficient translation of a byte address into a word address and byte offset value. The method provides greater flexibility in the organization of memory, thereby permitting designers to optimize memory system designs according to bandwidth requirements and other constraints.

In view of the above detailed description of the present invention and associated drawings, other modifications and variations will now become apparent to those skilled in the art. It should also be apparent that such other modifications and variations may be effected without departing from the spirit and scope of the present invention.

I claim:

1. A method for addressing a particular location of a memory organized as a plurality of words having three partitions, comprising:

receiving an address for the particular location of the memory;

converting the address to a floating point number; and multiplying the floating point number by a binary value of approximately one third, the result having an integer portion and a fraction portion.

2. The method of claim 1, wherein the step of multiplying the floating point number by a binary value of approximately one third is performed by combinational logic.

3. The method of claim 1, further comprising:

accessing the particular location of memory using the integer portion to specify a word and the fraction portion to specify a partition.

4. The method of claim 3, the two most significant bits of the fraction portion specifying the partition.

5. The method of claim 3 wherein each partition is one byte wide.

6. The method of claim 3 wherein each partition is four bytes wide.

7. The method of claim 3, the address having twenty-four bits.

8. The method of claim 1 performed by a communication switch circuit.

9. The method of claim 8, wherein the switch is substantially compliant with an Ethernet standard.

10. A data processing system, comprising:

processing circuitry;

a memory storing data for use by the processing circuitry, the memory organized as a plurality of words having three partitions accessible by an address; and an address translation circuit coupled to the processing circuitry and the memory, the address translation circuit configured to convert the address to a floating point number and multiply the floating point number by a binary value of approximately one third, the result having an integer portion and a fraction portion.

11. The data processing system of claim 10, the address translation circuit comprising combinational logic.

12. The data processing system of claim 11, the multiplication process being performed within a single cycle of a main clock signal used by the processing circuitry.

13. The data processing system of claim 10, the integer portion specifying a word in the memory and the fraction portion specifying a partition of the specified word.

14. The data processing system of claim 13, the two most significant bits of the fraction portion specifying the partition.

15. The data processing system of claim 10, wherein the processing circuitry and address translation circuit are formed on a common substrate.

16. The data processing system of claim 15, the common substrate forming part of a communication switch circuit.

17. The data processing system of claim 16, the communication switch substantially compliant with an Ethernet standard.

18. The data processing system of claim 10, further comprising:

a plurality of data busses coupled to the memory, each of the memory partitions accessible by a dedicated data bus.

19. The data processing system of claim 10, each partition being one byte wide.

20. The data processing system of claim 10, each partition being four bytes wide.

* * * * *